United States Patent
Shin

(10) Patent No.: US 7,698,563 B2
(45) Date of Patent: Apr. 13, 2010

(54) DEVICE AND METHOD FOR INPUTTING PASSWORD USING RANDOM KEYPAD

(76) Inventor: Hwa-Shik Shin, 504-308 Shindonga Apt., 1137-1 Sadang-Dong, Dongjak-Gu, Seoul 156-090 (KR)

( * ) Notice: Subject to any disclaimer, the term of this patent is extended or adjusted under 35 U.S.C. 154(b) by 1271 days.

(21) Appl. No.: 10/540,050

(22) PCT Filed: Dec. 23, 2003

(86) PCT No.: PCT/KR03/02802

§ 371 (c)(1),
(2), (4) Date: Jun. 22, 2005

(87) PCT Pub. No.: WO2004/057516

PCT Pub. Date: Jul. 8, 2004

(65) Prior Publication Data

US 2006/0053301 A1 Mar. 9, 2006

(30) Foreign Application Priority Data

Dec. 23, 2002 (KR) .................... 10-2002-0082853

(51) Int. Cl.
*G06F 21/00* (2006.01)
*G06F 7/04* (2006.01)
*G06F 12/00* (2006.01)
*G06F 19/00* (2006.01)
*G06F 9/06* (2006.01)
*G09F 9/35* (2006.01)

(52) U.S. Cl. .................... 713/184; 713/186; 726/5; 726/9; 726/18

(58) Field of Classification Search .................... 713/184
See application file for complete search history.

(56) References Cited

U.S. PATENT DOCUMENTS 5,168,961 A * 12/1992 Schneider .................... 186/52

(Continued)

FOREIGN PATENT DOCUMENTS

FR 2693815 A1 * 1/1994

(Continued)

OTHER PUBLICATIONS

Furkan Tari, A. Ant Ozok, Stephen H. Holden, "A comparison of perceived and real shoulder-surfing risks between alphanumeric and graphical passwords", Jul. 2006, SOUPS '06: Proceedings of the second symposium on Usable privacy and security, Publisher: ACM, pp. 56-66.*

*Primary Examiner*—Emmanuel L Moise
*Assistant Examiner*—Courtney D Fields
(74) *Attorney, Agent, or Firm*—Kile Goekjian Reed & McManus PLLC

(57) ABSTRACT

A device and a method for inputting passwords in ATM or door-lock and etc, having display means are provided. In particular, said device comprises a keypad in display means where numbers or letters for passwords are arranged randomly, and further comprises a keypad providing an indirect password numbers or letters randomly arranged, according to an original password, to be input in another indirect password keypad such that the original password of a user can be protected effectively from the others eye.

15 Claims, 8 Drawing Sheets

U.S. PATENT DOCUMENTS 5,428,684 A * 6/1995 Akiyama et al. .............. 705/66
6,148,406 A * 11/2000 Weisz et al. ................... 726/18

FOREIGN PATENT DOCUMENTS

| JP | 60-225218 | 11/1985 |
|---|---|---|
| JP | 62-242219 | 10/1987 |
| JP | 09-054862 | 2/1997 |
| JP | 2000-020468 | 1/2000 |
| JP | 2000-099801 | 4/2000 |
| KR | 1019980052634 | 9/1998 |
| KR | 1020020069959 | 9/2002 |

* cited by examiner

DEVICE AND METHOD FOR INPUTTING PASSWORD USING RANDOM KEYPAD

TECHNICAL FIELD

The present invention relates to an unmanned terminal having a display unit for financial transaction, or a locking device having a display unit for opening and closing a door, and a method for inputting a password to the devices, and more particularly, to a device for inputting a password by using a keypad with randomly arranged numbers and letters, by which the numbers on a password keypad provided through a display unit are provided in a randomly arranged form and the locations of password buttons change every time such that disclosure of a password can be prevented, or by which numbers and letters are provided together randomly on a password keypad to allow a user to recognize letters corresponding to numbers of a password and then a password keypad formed only with letters is displayed and the letters corresponding to the password are input by the user such that the password of the user can be effectively protected from disclosure to others, and a method for inputting a password using the device.

BACKGROUND ART

Generally, devices by which a password is input to authenticate an authorized user and then transaction is approved or a door is opened or closed, includes an unmanned terminal for financial transaction, a locking device for an entrance door or a safe, and electronic commerce systems on the Internet.

As an embodiment of such devices by which a password is input to authenticate an authorized user, simple financial transaction such as cash withdrawal, deposit, or transfer to an account of another bank is performed through an unmanned terminal, such as a cash dispenser or a cash dispenser and deposit machine using an automated teller machine (ATM), by a user personally using a credit card, a cash card, or a bankbook.

FIG. 1 shows an unmanned terminal for financial transaction generally used in this case. The unmanned terminal comprises a display unit 11 which provides information on the sequence and procedure of usage and according to user's input, displays a next screen; a card or bankbook recognition unit 12 which recognizes a card or a bankbook when the card or bankbook is inserted according to the procedure displayed on the display unit 11; a user detail retrieval unit 13 which reads out the account number of the card or bankbook inserted into the card or bankbook recognition unit 12 and retrieves financial information of the user from the main server of a financial institution; an input unit 17 with which transaction details and a password are input according to a procedure information screen displayed on the display unit 11; a memory 14 which stores a program for displaying usage procedure information sequentially on the display unit 11; a CPU 15 which executes the program stored in the memory 14; and a comparison unit 16 which compares a password input through the input unit 17 with the password of the user retrieved from the main server.

Also, with the same structure as shown in FIG. 1, but with a touch screen 11' as a display unit capable of both input and display, instead of the display unit 11 and the input unit 17, the unmanned terminal may be constructed as shown in FIG. 2.

In an operation method of the unmanned terminal constructed as described above, first, in order to withdraw, deposit, or transfer money, the user selects the type of desired transaction through the input unit 17 according to information displayed on the display unit 11 of the unmanned terminal. Then, according to the selected transaction type, the display unit 11 displays a request to insert a card or a bankbook. If the card or bankbook is inserted according to the request, the card or bankbook recognition unit 12 reads out an account number stored in the magnetic strip of the card or bankbook, and by using the account number, the user detail retrieval unit 13 retrieves user's transaction information from the main server of a corresponding financial institution. And, if the amount of money to be withdrawn or deposited, or information on money transfer is input and the finish button is pushed, the display unit 11 displays a request to input a password. Next, the user inputs a password by using the input unit 17 or when the display unit is a touch screen 11', inputs a password by touching numbers on the password keypad displayed on the screen. If the password is input thus, the comparison unit 16 compares the input password with a password included in the user transaction information retrieved from the main server, and if two passwords are identical, approves the transaction, or else the initial screen is displayed again and the inserted card or bankbook is pushed out such that the transaction can be processed from the beginning again.

As described above, the unmanned terminal, by which a password is input to get approval for transaction, enables a user to input a password by using the display unit and input unit for approval of financial transaction and to perform the transaction. However, if the card or bankbook for financial transaction is lost or the password is exposed to others, the finder of the card or password can easily withdraw cash such that economic loss to the user can be serious. In particular, since the keypad for inputting a password is in a fixed form in the unmanned terminal for financial transaction, if when the user uses the keypad, another person watches the user or monitors the movement of the button-pushing arm of the user, the password can be easily disclosed.

In addition, as another embodiment of a password input device by which a password is input to authenticate an authorized user, there is a locking device.

The locking device stores a password initially set, and whenever it is used, a password is input and compared with the original password. If the two passwords are identical, the locking device is unlocked, or else a request to input a password again is displayed.

However, since an identical password is continuously used in the locking device, the trace remains on the buttons corresponding to the password and others can easily combine the password from the trace and input the combined password. Accordingly, there is a problem that the password can be disclosed to others. In addition, even though an authorized user uses the locking device, another person standing next to the user can easily learn the password by observing the password input action and inferring the password based on the location of numbers on the keypad.

DISCLOSURE OF THE INVENTION

To solve the above problems, it is an objective of the present invention to provide a method and apparatus by which in a device for authenticate or confirm an authorized user by inputting a password, a password keypad with randomly arranged numbers is displayed on a display unit, or when the device is first used, numbers and letters are arranged together so that a user can memorize letters corresponding to numbers of a password, and then a letter keypad is displayed so that the user can input letters corresponding to the numbers of a password, and by doing so, even though another person watches the user input a password, the password cannot be inferred and disclosure of the password can be prevented.

According to an aspect of the present invention, there is provided an unmanned terminal in which a password is input by using a randomly arranged keypad comprising: a display unit which provides information on the sequence and procedure of usage for financial transaction and according to user's input, displays a next screen; a card or bankbook recognition unit which recognizes a card or a bankbook when the card or bankbook is inserted according to the procedure displayed on the display unit; a user detail retrieval unit which reads out the account number of the card or bankbook inserted into the card or bankbook recognition unit and retrieves financial information of the user from the main server of a financial institution; an input unit with which transaction details and a password are input according to a procedure information screen displayed on the display unit; a memory which stores a program for displaying usage procedure information sequentially on the display unit; a CPU which executes the program stored in the memory; and a comparison unit which compares a password input through the input unit with the password of the user retrieved from the main server, wherein the memory stores cases of numbers to randomly arrange 10 numbers from 0 to 9, and a program to provide a randomly arranged password keypad on the display unit by using the cases of numbers, and the CPU drives the program to randomly arrange 10 numbers stored in the memory to be displayed on the display unit.

According to another aspect of the present invention, there is provided a method for inputting a password by using a randomly arranged password keypad of an unmanned terminal in a financial transaction, wherein by using the unmanned terminal for financial transaction of claim 1, according to the procedure displayed on a display unit of the terminal, the type of transaction is selected, the amount of money is input, and a password is input so that the transaction is approved, the method comprising: if a user inputs the amount of transaction money through a touch screen, driving a program stored in a memory to display a randomly arranged password keypad on a display unit; and inputting a password through the randomly arranged password keypad.

BEST MODE FOR CARRYING OUT THE INVENTION

Figure 1:
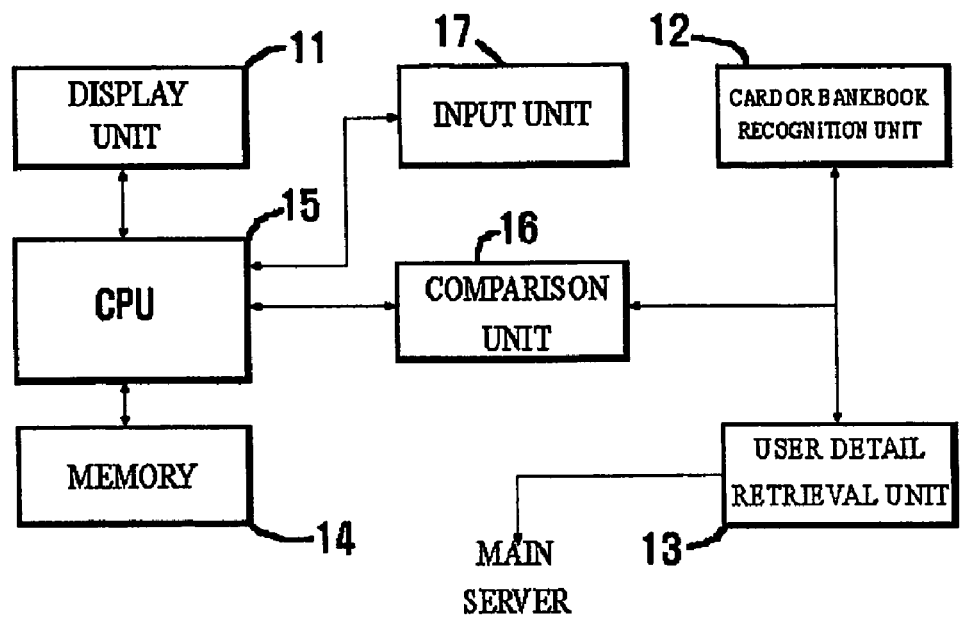
FIG. 1 is a diagram of an unmanned terminal for financial transaction.
Figure 2:
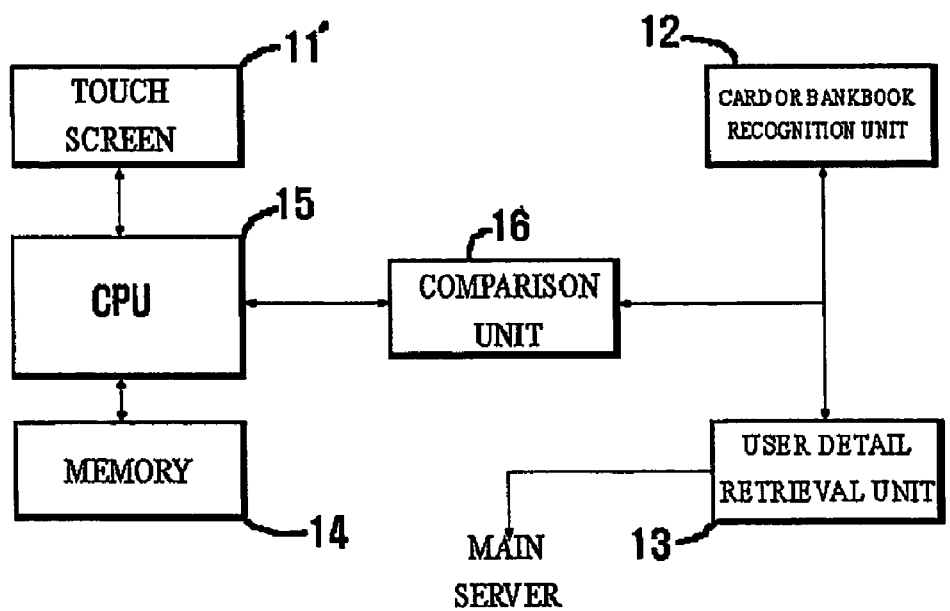
FIG. 2 is a diagram of another unmanned terminal for financial transaction.
Figure 3:
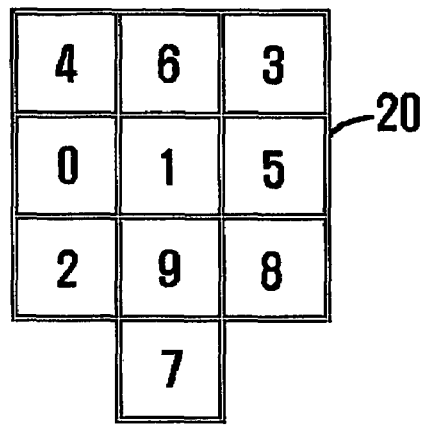
FIG. 3 is a diagram of an embodiment of a password keypad which is displayed on a display unit and in which numbers are randomly arranged according to the present invention.
Figure 4:
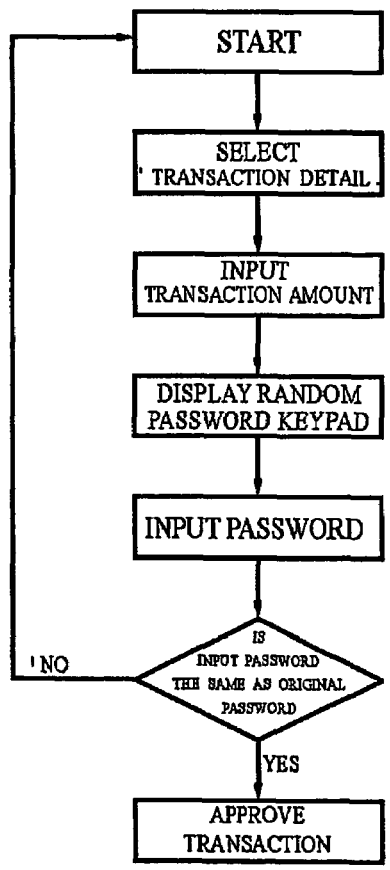
FIG. 4 is a flowchart of the steps performed by a method for inputting a password by using the password keypad with randomly arranged numbers displayed on the display unit according to the present invention.

First, an unmanned terminal for financial transaction will now be explained as an example. An unmanned terminal which is one of input devices for authenticating an authorized user by inputting a password according to the present invention has the same structure as the prior art unmanned terminal as shown in FIGS. 1 or 2. However, in the terminal according to the present invention, a memory 14 stores cases of numbers in which 10 numbers from 0 to 9 are randomly arranged according to a desired array form, and a program for extracting randomly a case of numbers and providing the case to a display unit. When according to a procedure a user should push an input part on the display unit 11 or 11' or touch the touch screen 11' in order to input transaction details and the amount of money, and in the final step a password keypad should be displayed for inputting a password, the CPU 15 makes a password keypad 20 with 10 numbers randomly arranged as shown in FIG. 3 displayed on the display unit 11. At this time, whenever the user uses the device, the CPU 15 drives a program stored in the memory 14, and extracts randomly and arranges any one case of numbers such that the password keypad 20 is displayed.

In addition, when the touch screen 11' capable of both input and display as a display unit as shown in FIG. 2 is used, a password is input by pushing numbers randomly displayed on the touch screen 11' without a separate input means.

Next, another embodiment of a method for inputting a password through an indirect password such as letters provided through the display unit 11 will now be explained.

Figure 5:
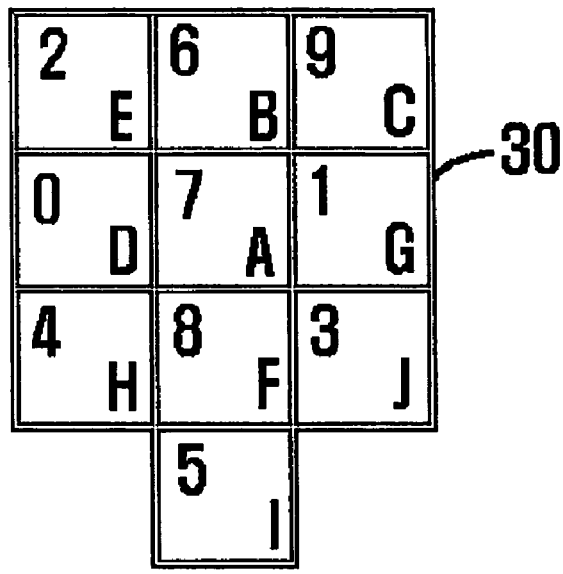
FIG. 5 is a diagram of an indirect password recognition keypad with randomly arranged numbers and letters displayed on the display unit according to the present invention.
Figure 6:
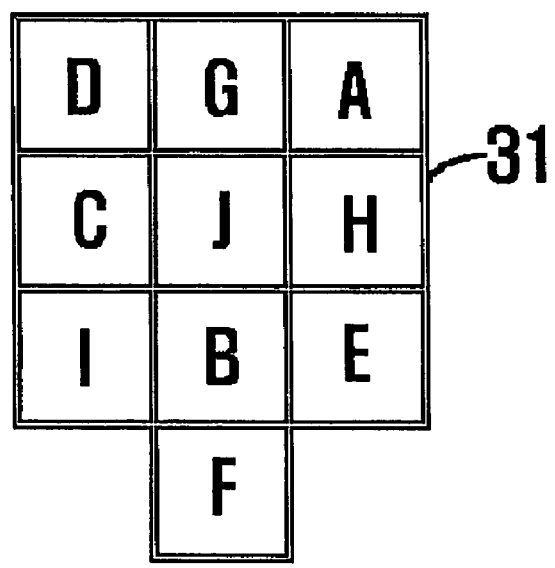
FIG. 6 is a diagram of an indirect password keypad for inputting an indirect password recognized through the indirect password recognition keypad of FIG. 5 according to the present invention.

In the memory 14 of an unmanned terminal constructed as shown in FIG. 1 or 2, stored are cases of numbers and letters for randomly arranging each pair of a number and a letter from 10 numbers from 0 to 9 and 10 letters from A to J, respectively, and cases of letters in which only the 10 letters from A to J are randomly arranged in 10 key positions. Also stored is a program to display a keypad in which a pair of a number and a letter from the cases of numbers and letters is randomly arranged in each key position of the keypad, and a keypad in which only letters are randomly arranged, on the display unit. At this time, the keypad as shown in FIG. 5 in which numbers and letters are arranged together is referred to as an indirect password recognition keypad 30, and the keypad as shown in FIG. 6 in which only letters are arranged is referred to as an indirect password keypad 31. In addition, the indirect password recognition keypad as shown in FIG. 5 may be formed by displaying numbers in a predetermined order and randomly arranging only letters corresponding to the numbers so that a user can easily recognize an indirect password. Also, in the indirect password keypad as shown in FIG. 6, letters may be randomly arranged on the keypad or may be displayed in a predetermined order so that the user can easily input the indirect password formed with letters.

By driving the program stored in the memory 14, the CPU 15 displays according to a procedure the indirect password recognition keypad 30 with a number and a letter randomly arranged in each key position, and the indirect password keypad 31 with only letters arranged, through the display unit 11. At this time, the indirect password keypad 31 may be automatically displayed after a time enough for the user to recognize the indirect password formed by letters through the indirect password recognition keypad 30, or when the user touches an arbitrary button forming the input unit or the touch screen.

A password input method using an unmanned terminal which has the memory 14 storing the cases of numbers forming the indirect password recognition keypad 30 and the indirect password keypad 31 and the program for displaying keypads with randomly extracted cases of numbers and letters, and the CPU 15 driving the program to randomly provide the keypads to the display unit 11 and calculating the original password from an input indirect password, will now be explained referring to some examples.

Figure 7:
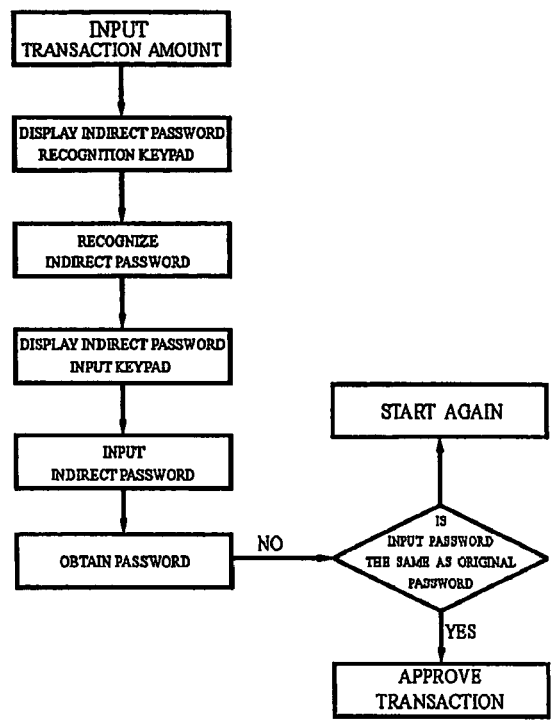
FIG. 7 is a flowchart of the steps performed by a method for inputting a password by using the indirect password recognition keypad of FIG. 5 and the indirect password keypad of FIG. 6.

First, as shown in FIG. 7, a user selects a transaction type in front of an unmanned terminal, inserts a bankbook or a card to be authenticated as an authorized customer, and inputs the amount of money. Then, an indirect password recognition keypad 30 as shown in FIG. 5 in which each pair of a number and a letter from 10 numbers and 10 letters is randomly arranged in each key position, respectively, is displayed on a display unit 11. If the indirect password recognition keypad 30 is thus displayed, the user recognizes letters corresponding to his password in order. If the recognition of the indirect password is finished, after a predetermined time interval, or by touching the input unit or the display unit, the program is driven as described above and one of cases of numbers forming the indirect password keypad 31 is randomly extracted from the memory 14 and displayed on the display unit 11 as shown in FIG. 6. If the indirect password keypad is thus displayed, the user inputs the indirect password recognized right before in order by pushing the letters buttons.

In addition, if the input unit is implemented by the touch screen 11' capable of both input and display as shown in FIG. 2, then when the indirect password keypad is displayed, the indirect password is input by touching the corresponding letters.

If the indirect password is thus input, the CPU 15 retrieves numbers corresponding to input letters, from the initially displayed indirect password recognition keypad and obtains the password input by the user. Through the comparison unit 16, the original password retrieved from the main server is compared with the input password. If two numbers are identical, the transaction is approved, or else the initial screen is returned so that the procedure is followed again from the beginning.

Figure 8:
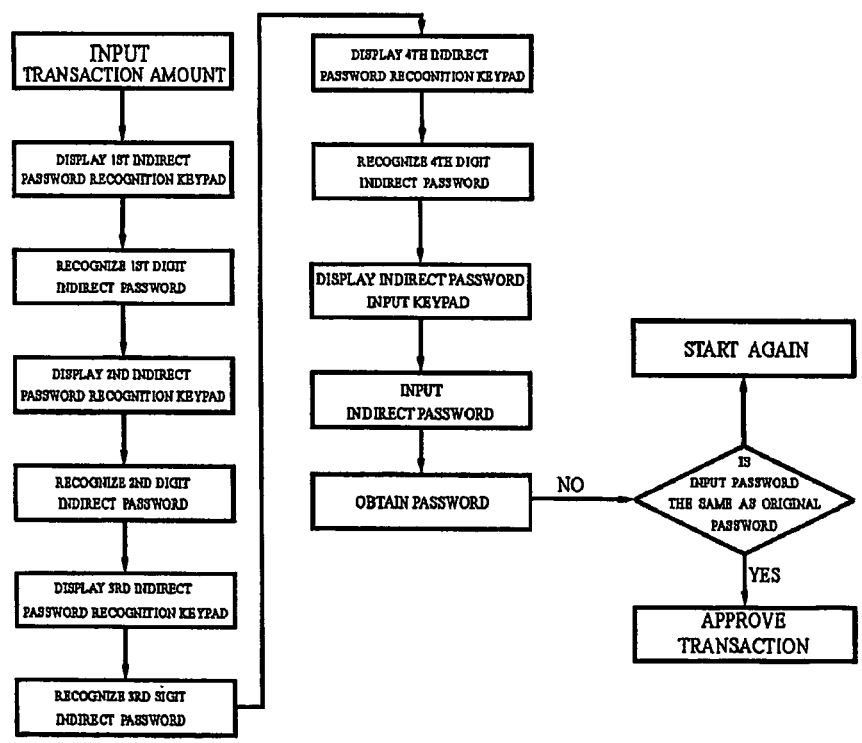
FIG. 8 is a flowchart of the steps performed by another method for inputting a password by using the indirect password recognition keypad of FIG. 5 and the indirect password keypad of FIG. 6.

Next, another method for inputting a password by using the indirect password recognition keypad and the indirect password keypad will now be explained. As shown in FIG. 8, in following the procedure by using the unmanned terminal, the user inputs the amount of money for transaction. Then, by driving the program stored in the memory 14, the CPU 15 of the unmanned terminal extracts one of cases of numbers forming the indirect password recognition keypad 30, and displays a first indirect password recognition keypad on the display unit 11, and the user recognizes a letter corresponding to the first digit of his password. If the user completes recognition of a letter corresponding to the first digit of his password, a second indirect password recognition keypad is displayed so that the user can recognize the indirect password corresponding to the second digit of his password. If the recognition is completed, third and fourth indirect password keypads are displayed so that the user can recognize the indirect password corresponding to the remaining digits sequentially. At this time, for a time point for displaying the indirect password keypad after the user recognizes all indirect password digits, the indirect password keypad may be made to be displayed automatically after a predetermined time interval, or the recognition of the indirect password can be made to be confirmed by the user pushing an arbitrary button on the input unit or touching the touch screen. If the recognition of the indirect password is completed as described above through the same number of indirect password recognition keypads as the number of digits of the password, the indirect password keypad is displayed through the display unit 11. If the indirect password keypad is displayed, the indirect password is input through the input unit 17 forming the unmanned terminal. The input unit may be formed with a touch screen or segment push buttons or the like.

If the indirect password is thus input, the CPU 15 retrieves numbers corresponding to letters in the indirect password recognition keypad 30 initially provided, and obtains the original password from the indirect password input by the user. Through the comparison unit 16 of the unmanned terminal, it is determined whether or not the original password is identical with the input password. If two numbers are identical the transaction is approved, or else the initial screen is displayed again so that the procedure is followed again from the beginning.

Figure 9:
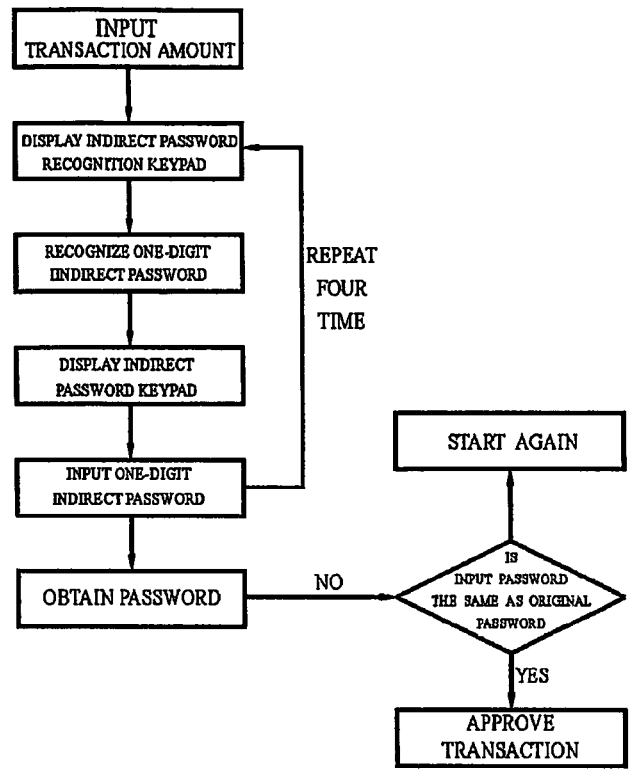
FIG. 9 is a flowchart of the steps performed by still another method for inputting a password by using the indirect password recognition keypad of FIG. 5 and the indirect password keypad of FIG. 6.

Next, still another method for inputting a password by using the indirect password recognition keypad and the indirect password keypad with randomly provided keys will now be explained. As shown in FIG. 9, in following the procedure by using the unmanned terminal, the user inputs the amount of money for transaction. Then, by driving the program stored in the memory 14, the CPU 15 of the unmanned terminal displays a first indirect password recognition keypad on the display unit 11, and if the recognition of indirect password is completed, as the next step, displays a first indirect password keypad on the display unit 11 so that the user can input the recognized first indirect password. Then, the user inputs the first digit of the indirect password by using the first indirect password keypad displayed on the display unit 11. Next, in the same manner the same number of indirect password recognition keypads as the number of remaining digits of the password are sequentially displayed so that the remaining digits of the indirect password can be input. If the input of the same number of indirect password digits as the digits of the original password is completed, the CPU 15 retrieves numbers corresponding to the letters, from the same number of indirect password recognition keypads sequentially provided as the number of the digits of the original password, and obtains the password input by the user. Then, through the comparison unit 16, it is determined whether or not the original password is identical with the input password. If two numbers are identical the transaction is approved, or else the initial screen is displayed again so that the procedure is followed again from the beginning.

Next, an example of a locking device, as another embodiment of a device using a password keypad with randomly arranged numbers and letters, will now be explained.

Figure 10:
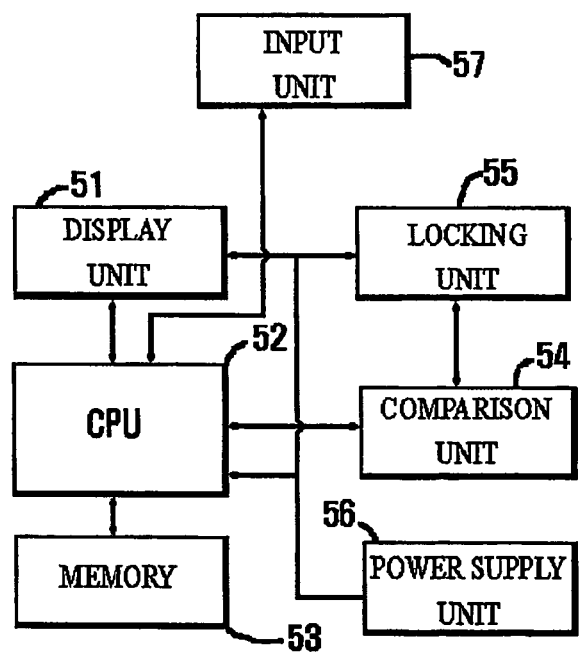
FIG. 10 is a diagram of a locking device, an embodiment of a device for which a password is input by using a password keypad with randomly arranged numbers and letters according to the present invention.

FIG. 10 is a diagram of a locking device which is another embodiment of a device for which a password is input by using a password keypad with randomly arranged numbers and letters according to the present invention. As shown in the figure, the locking device comprises a display unit 51 which displays a password keypad in order to set a password or input a set password; an input unit 57 with which a password is input through a password keypad displayed on the display unit 51; a memory 53 which stores cases of numbers for randomly arranging the password keypad and a program to display a password keypad randomly arranged by using the cases of numbers; a CPU 52 which drives the program stored in the memory 53 and displays a password keypad on the display unit 51 for setting a password or inputting a set password; a comparison unit 54 which sets and stores the password and compares it with a password input through the input unit 57; a locking unit 55 which locks or unlocks according to the comparison result of the comparison unit 54; and a power supply unit 56 which operates the locking device. If the locking device is not used for a predetermined time, the power supply unit 56 cuts off power supply and if the user pushes an arbitrary button on the input unit, provides power again so that the locking device can be used.

Figure 11:
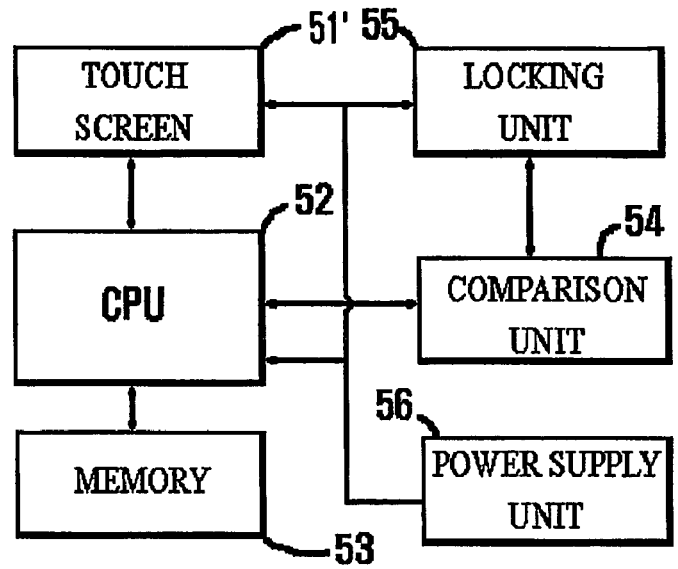
FIG. 11 is a diagram of another embodiment of the locking device shown in FIG. 10.

Next, FIG. 11 is a diagram of another embodiment of the locking device for which a password keypad with randomly arranged numbers and letters is displayed and using the keypad, a password is input. The locking device has the same structure as that of the locking device in FIG. 10, but has a touch screen 51' as a display unit to display a password keypad such that the input part is not formed separately. Also, when the locking device is not used for a predetermined time, the power supply 56 cuts off power supply and if the user touches the touch screen, provides power again so that the locking device can be used.

In addition, in order for the input unit to have a display unit function together, segment light emitting diode can be installed for each button of the input unit so that randomly displayed numbers or letters can be expressed.

For the usage method of the locking devices, after the installation of the device is finished, the user sets a password which only the user knows, by using the input unit 57 or the touch screen 51', and stores it in the comparison unit 54.

A method for unlocking the locking device by inputting a password in the locking devices constructed as described above will now be explained referring to some embodiments.

First, a method for inputting a password to unlock the locking device after a password keypad with only numbers randomly arranged is displayed on the display unit or the touch screen will now be explained. The CPU 52 drives the program for randomly arranging 10 numbers stored in the memory 53 such that a password keypad with randomly arranged numbers is displayed on the display unit 51. At this time, the numbers may be arranged as desired when the program is first written, for example, 3 rows 4 columns or 5 rows 2 columns. In addition, when the user uses the device, the CPU 52 drives the program stored in the memory 53, randomly extracts one of the stored cases of numbers and displays a password keypad such that a password keypad with always different arrangement of numbers is displayed.

Figure 12:
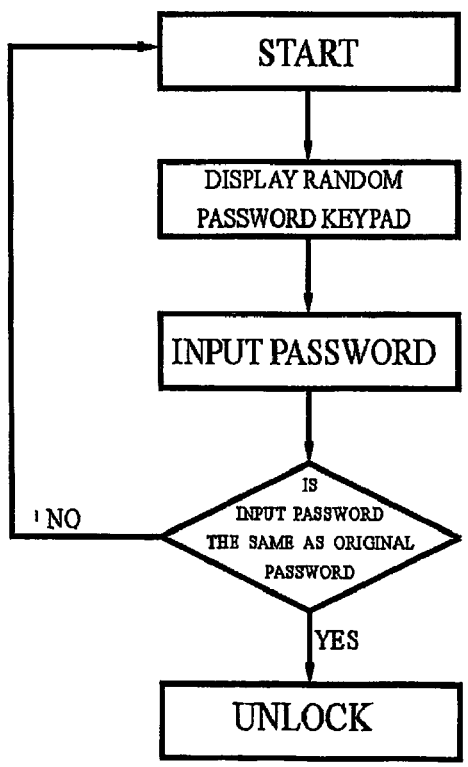
FIG. 12 is a flowchart of the steps performed by a method for inputting a password by using a password keypad randomly provided through the display unit of FIG. 10 or 11.

A method for inputting a password through a password keypad with randomly arranged numbers, which is displayed on the display unit of the locking device, will now be explained. First, as shown in FIG. 12, in order to use the locking device, the user pushes an arbitrary button on the input unit of the locking device or touches the touch screen, which is one of the display means. Then, the power supply unit 56 resumes power supply and the CPU 52 drives the program stored in the memory 53, selects one of cases of numbers for randomly arranging 10 numbers from 0 to 9, and display a randomly arranged password keypad. Through the password keypad thus displayed on the display unit 51, the user pushes numbers corresponding to his password to input the password. Then, the input password is compared with the stored original password by the comparison unit 54. If the passwords are identical, the locking unit 55 is unlocked, or else a password keypad with randomly arranged numbers is displayed again on the display unit 51 so that a password is input again. At this time, a method for inputting a password varies depending on the structure of the locking device.

Also, when the display unit is a touch screen 51', or segment light emitting diodes are used to directly express numbers on respective buttons of the input unit, the user touches the password keypad displayed on the touch screen, or pushes buttons of the password displayed by the segment light emitting diodes.

Next, in order to display the indirect password recognition keypad 30 and the indirect password keypad 31, as shown in FIGS. 5 and 6, the memory 53 of the locking device constructed as described above stores cases of numbers and letters for randomly arranging each pair of a number and a letter from 10 numbers from 0 to 9 and 10 letters from A to J, respectively, and cases of letters, in which 10 letters from A to J are randomly arranged, and also a program to display the indirect password recognition keypad 30 and the indirect password keypad 31 randomly arranged on the display unit by using the cases of numbers and letters, and the cases of letters.

Also, the CPU 52 drives the program stored in the memory, displays the indirect password recognition keypad and the indirect password keypad sequentially on the display unit 51, and obtains a password from an input indirect password.

Embodiments of a method for inputting a password using a locking device comprising the memory 53 storing cases of numbers and letters forming the indirect password recognition keypad 30 and the indirect password keypad 31 and the program to display the keypads using the cases of numbers and letters on the display unit, and the CPU 52 driving the program stored in the memory and obtaining a password from an input indirect password will now be explained.

Figure 13:
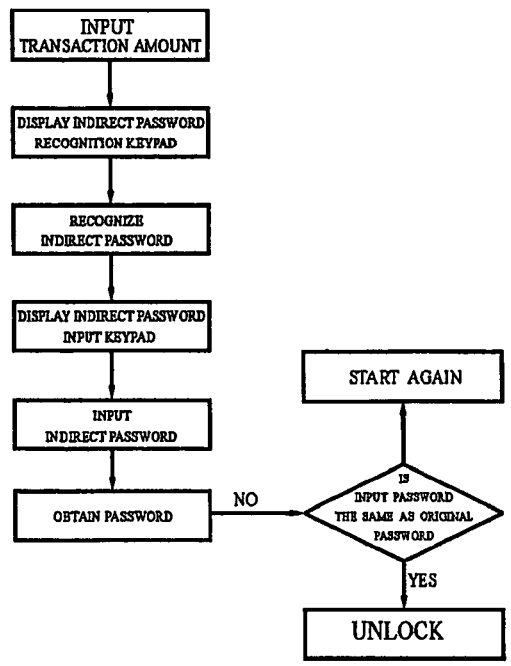
FIG. 13 is a flowchart of the steps performed by an embodiment of a method for inputting a password by using the indirect password recognition keypad of FIG. 5 and the indirect password keypad of FIG. 6 provided through the display unit of FIG. 10 or 11.

First, as shown in FIG. 13, the user in front of the locking device pushes an arbitrary button of the input unit 57, or touches the touch screen 51'. Then, the power supply unit 56 resumes power supply and an indirect password recognition keypad 30, as shown in FIG. 5, in which each pair of a number and a letter from 10 numbers and 10 letters is randomly arranged respectively in a key position is displayed. If the indirect password recognition keypad is thus displayed, the user sequentially recognizes letters corresponding to his original password, and after a predetermined time interval, or by pushing an arbitrary button, or by touching the touch screen, the indirect password keypad is made to be displayed. Next, the CPU 52 drives the program to form the indirect password keypad 31, displays the indirect password keypad 31 as shown in FIG. 6 on the display unit 51. At this time, if the display unit being used is the touch screen 51' or segment light emitting diodes in which a letter is displayed on each push button, the recognized letters are directly touched on the touch screen or corresponding push buttons are pushed to input the password.

If the indirect password is thus input, the CPU 52 retrieves numbers corresponding to the letters from the initially displayed indirect password recognition keypad, and obtains the password input by the user. The original password stored in the comparison unit 54 is compared with the input password. If the two passwords are identical, the locking unit 55 unlocks or else the indirect password keypad is again displayed so that a password is input again.

Figure 14:
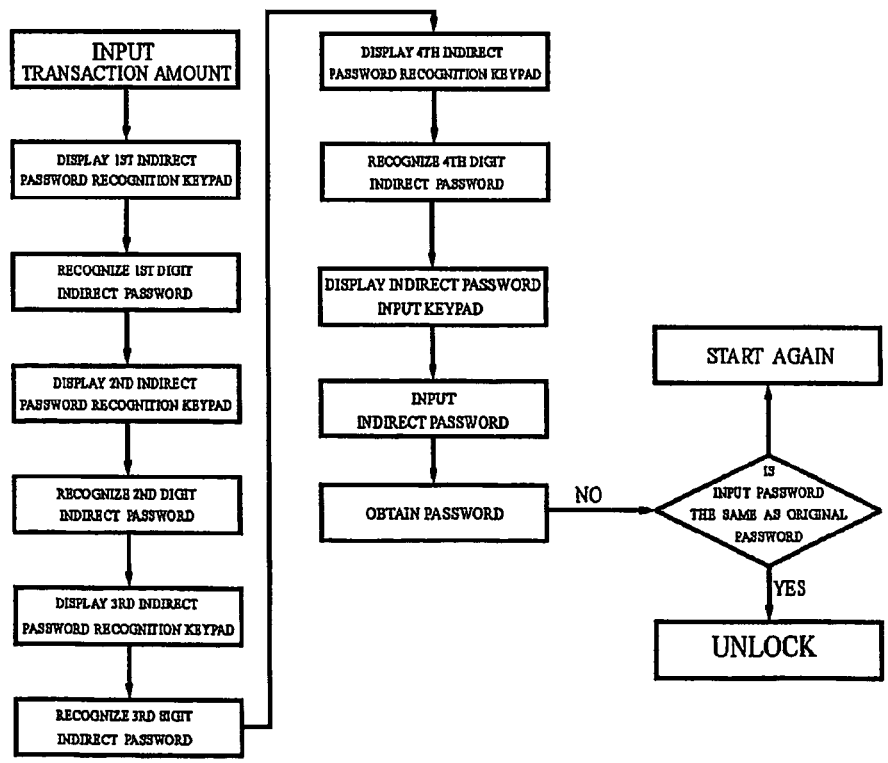
FIG. 14 is a flowchart of the steps performed by another embodiment of a method for inputting a password by using the indirect password recognition keypad of FIG. 5 and the indirect password keypad of FIG. 6 provided through the display unit of FIG. 10 or 11.

Next, another method for inputting a password to unlock the locking device by using the indirect password recognition keypad and the indirect password keypad as described above will now be explained. As shown in FIG. 14, the user touches the display unit 51 of the locking device or pushes an arbitrary button on the input unit 57. Then, the CPU 52 drives the program stored in the memory 53 and displays a first indirect password recognition keypad on the display unit 51 so that the user can recognize a letter corresponding to the first digit of his password. After a predetermined time interval, or by pushing an arbitrary button or touching the touch screen, a second indirect password recognition keypad is displayed so that the user can recognize a letter corresponding to the second digit of his password. In the same manner, third and fourth password recognition keypads are displayed so that the user can recognize letters corresponding to the third and fourth digits of his password. If the recognition of four digits indirect password is thus completed, the CPU drives the program to form an indirect password keypad with randomly arranged letters and displays the indirect password keypad 31 on the display unit 51. In a method for inputting the indirect password after the indirect password keypad 31 is thus displayed, if the display unit is the touch screen or segment light emitting diodes in which a letter is displayed on each push button, the recognized letters are directly touched on the touch screen or corresponding push buttons are pushed to input the password as explained in FIG. 12.

If the password is thus input, the CPU 52 obtains a password corresponding to the input letters according to repeatedly displayed indirect password recognition keypads and sends the password to the comparison unit 54. The comparison unit 54 compares the password with the original password, and if the two passwords are identical, makes the locking unit 55 unlock, or else the procedure is followed again from the beginning.

Figure 15:
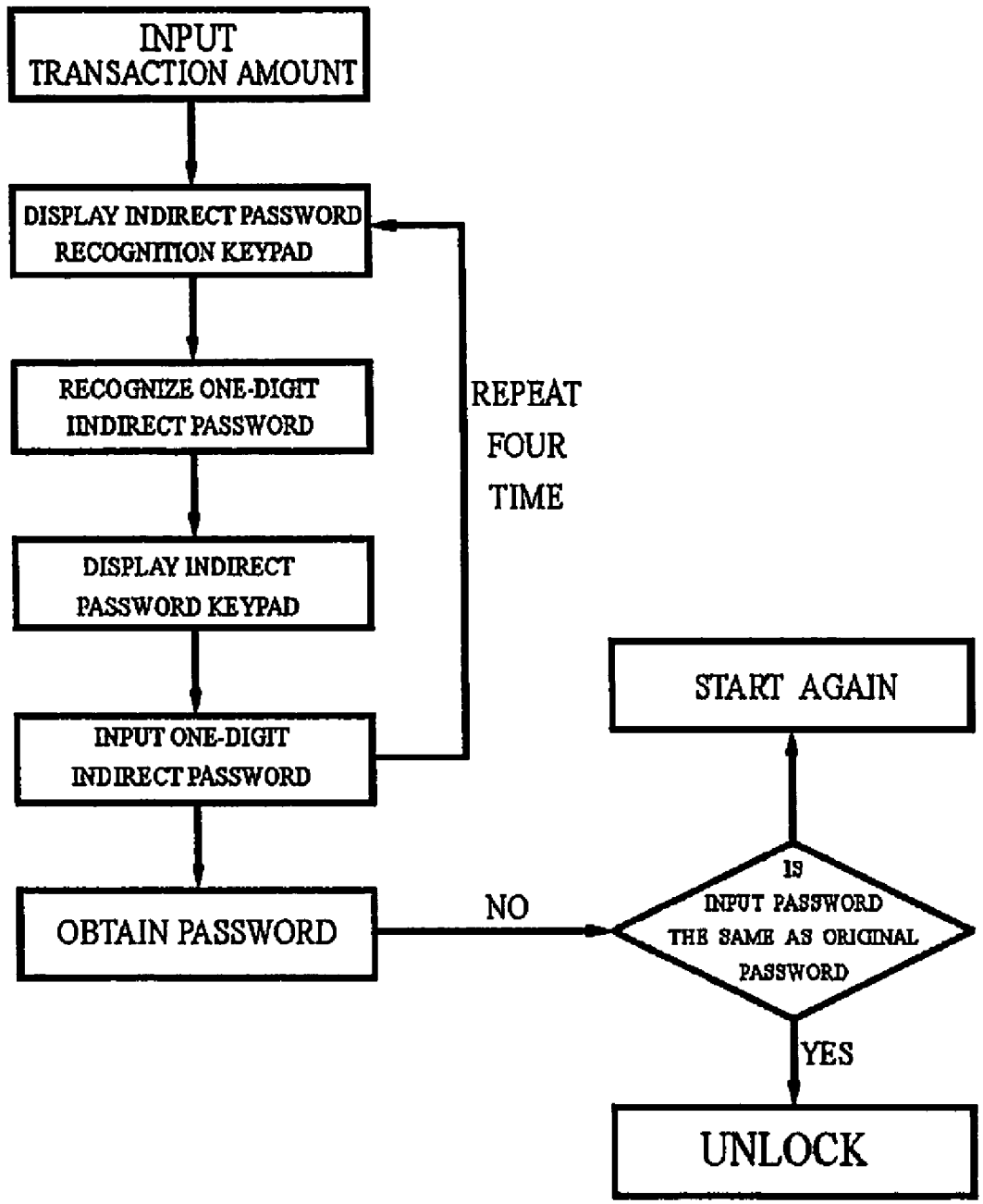
FIG. 15 is a flowchart of the steps performed by still another embodiment of a method for inputting a password by using the indirect password recognition keypad of FIG. 5 and the indirect password keypad of FIG. 6 provided through the display unit of FIG. 10 or 11.

Next, still another method for inputting a password to unlock the locking device by using the indirect password recognition keypad and the indirect password keypad as described above will now be explained. As shown in FIG. 15, if the display unit of the locking device is touched or an arbitrary button on the input unit is pushed, the CPU 52 drives the program stored in the memory 53 and displays a first indirect password recognition keypad with randomly arranged numbers and letters on the display unit 51 so that the user can recognize a letter corresponding to the first digit of his password. If the recognition of the letter corresponding to the first digit of the password through the displayed first indirect password recognition keypad is completed, then a first indirect password keypad with randomly arranged letters is displayed so that the user can input the recognized letter. Next, if the user inputs the recognized first letter on the indirect password keypad displayed on the display unit 51, the CPU drives the program stored in the memory and displays a second indirect password recognition keypad with randomly arranged numbers and letters so that the user can recognize the second letter. If the user completes recognition of the letter corresponding to the second digit of the password, a second indirect password keypad with randomly arranged letters is displayed so that the user can input the second letter. Next, in the same manner, the third and fourth letters of the indirect password are input. At this time, if the number of digits of a password is large, the password can be input by repeating the above procedure at the same times as the number of digits of the password. If the input of the indirect password at the same times as the number of digits of the password is thus completed, the CPU 52 retrieves numbers corresponding to the input letters from the already provided indirect password recognition keypads, obtains the password input by the user, and compares the password initially set and stored by the comparison unit, with the input password to determine whether the two passwords are identical. If the two passwords are identical, the locking device is unlocked, or else the indirect password recognition keypads and the indirect password keypads are sequentially displayed again so that the indirect password is input once again.

INDUSTRIAL APPLICABILITY

As described above, in the present invention, in a password input device such as an unmanned terminal and a locking device, a keypad for inputting a password is made to have randomly arranged numbers, or an indirect password is input by using letters. At this time, in addition to the English alphabet, consonants or vowels of Korean alphabet, or simple letters, or symbols easy to remember can be used as the letters.

As described above, in an unmanned terminal or a locking device providing a randomly arranged password keypad, and a method for inputting a password using the devices according to the present invention, a password is directly input according to the randomly arranged password input keypad, or after the initial indirect password recognition keypad is recognized only by eyes, an indirect password is input by using letters instead of numbers. Accordingly, even when another person watches the user input the password, the password of the user cannot be learned and disclosure of the password can be prevented.

In addition, whenever the user having the actual password formed with numbers inputs the password, he always pushes different positions, or inputs letters of the indirect password. Accordingly, there is the same effect as a variety of passwords are used.

Furthermore, by using different buttons according to a displayed keypad arrangement without pushing identical buttons on the input unit in the locking device, the device does not leave traces on some predetermined buttons.

Also, since the prior art unmanned terminal or locking device can be used by adding just a program, the password being currently used can be used continuously without change.

Besides, the locking device of the present invention is unlocked by inputting a password by using numbers or letters such that a separate tool such as a key is not needed and therefore there is no danger of losing a key.

Also, when inputting of a password is needed on a web page, for example, in e-commerce over the Internet, Internet banking, and Internet stock trade, the indirect password recognition keypad 30 as shown in FIG. 5 is displayed on a display apparatus and the user is requested to push alphabet keys corresponding to the password such that the original password can be protected from the danger of hacking due to direct input of the password and disclosure of the original password can be prevented.

What is claimed is:

1. An unmanned terminal comprising:
a display unit which provides information on the sequence and procedure of usage for financial transaction and according to user's input, displays a next screen;
a card or bankbook recognition unit which recognizes a card or a bankbook when the card or bankbook is inserted according to the procedure displayed on the display unit;
a user detail retrieval unit which reads out the account number of the card or bankbook inserted into the card or bankbook recognition unit and retrieves financial information of the user from the main server of a financial institution;
an input unit with which transaction details and a password are input according to a procedure information screen displayed on the display unit;
a memory which stores a program for displaying usage procedure information sequentially on the display unit;
a CPU which executes the program stored in the memory; and
a comparison unit which compares a password input through the input unit with the password of the user retrieved from the main server,
wherein cases of numbers and letters to randomly arrange a pair of a number from 0 to 9 and a letter from A to J corresponding to each number, cases of letters to randomly arrange 10 letters from A to J, and a program to display on the display unit an indirect password recognition keypad and an indirect password keypad by using the cases of numbers and letters are stored in the memory; and
the CPU drives the program stored in the memory and provides an indirect password recognition keypad, in which each pair of a number and a letter is randomly arranged, on the display unit, and if user's recognition of an indirect password through the indirect password recognition keypad is completed, the CPU displays an indirect password keypad, in which only the letters are randomly arranged, and if an indirect password formed by letters is input through the indirect password keypad, obtains a password formed by numbers by comparing the input indirect password with the already provided indirect password recognition keypad.

2. A method for inputting a password by using a randomly arranged password keypad of an unmanned terminal in a financial transaction method using an unmanned terminal, wherein by using the unmanned terminal of claim 1, the type of transaction is selected, the amount of money is input, and a password is input so that the transaction is approved and the transaction is completed, the method comprising:
if the amount of transaction money is input through a display unit, CPU driving the program stored in the memory and displaying an indirect password recognition keypad on the display unit;
if the recognition of an indirect password through the indirect password recognition keypad is completed, driving the program stored in the memory to provide an indirect password keypad on the display unit;
by using the indirect password keypad provided on the display unit, inputting an indirect password recognized as letters; and
based on the input indirect password, retrieving the provided indirect password recognition keypad, obtaining a password, and comparing the password with an original password in the comparison unit.

3. The method for inputting a password of claim 2, wherein as the indirect password, any one of consonants, vowels, and combinations thereof of the Korean alphabet, and simple symbols is used instead of the English alphabet.

4. The method for inputting a password of claim 2, further comprising:
repeatedly and randomly displaying the indirect password recognition keypad at the same times as the number of digits of a password and whenever the keypad is displayed, recognizing an indirect password corresponding to each one digit of the password; and
after an indirect password is recognized through the indirect password recognition keypads displayed at the same times as the number of digits of a password, inputting the indirect password at once through a randomly arranged indirect password keypad.

5. The method for inputting a password of claim 2, further comprising:
sequentially displaying the indirect password recognition keypad and the indirect password keypad and inputting the first digit of an indirect password; and
by repeating the displaying and inputting, inputting the remaining digits of the indirect password.

6. A locking device in which a password is input by using a randomly arranged keypad to be authenticated as an authorized user, the locking device comprising:
a display unit which displays a password keypad in order to set a password or input a set password;
an input unit with which a password is input through a password keypad displayed on the display unit;
a memory which stores cases of numbers and letters to randomly arrange a pair of a number from 0 to 9 and a letter from A to J corresponding to each number, cases of letters to randomly arrange 10 letters from A to J, and a program to display on the display unit an indirect password recognition keypad and an indirect password keypad by using the cases of numbers or letters on the display unit;
a CPU which drives the program stored in the memory and provides an indirect password recognition keypad, in which each pair of a number and a letter is randomly arranged, on the display unit, and if user's recognition of an indirect password through the indirect password recognition keypad is completed, the CPU displays an indirect password keypad, in which only the letters are randomly arranged, and if an indirect password formed by letters is input through the indirect password keypad, obtains a password formed b numbers by comparing the input indirect password with the already provided indirect password recognition keypad;
a comparison unit which sets and stores the password and compares it with a password input through the input unit;
a locking unit which locks or unlocks according to the comparison result of the comparison unit, and
a power supply unit which operates the locking device.

7. The locking device of claim 6, wherein if locking device is not used for a predetermined time, the power supply unit cuts off power supply and if the user touches a touch screen, provides power again.

8. The locking device of claim 6, wherein the display unit is a touch screen capable of display and input at the same time, and does not need an input unit.

9. The locking device of claim 6, wherein the display unit is segment light emitting diodes capable of directly displaying numbers or letters on respective push buttons of the input unit.

10. A method for inputting a password by using a randomly arranged password keypad in the locking device of claim 6, wherein a password is input by using a randomly arranged keypad, the method comprising:
- if power is supplied by user's manipulation, the CPU driving the program stored in the memory and displaying an indirect password recognition keypad on the display unit;
- if the indirect password is recognized, driving the program stored in the memory and displaying an indirect password keypad on the display unit;
- inputting an indirect password recognized as letters by using the indirect password keypad provided on the display unit; and
- based on the input indirect password, obtaining a password by comparing the input indirect password with the indirect password recognition keypad, and comparing the obtained password with an original password in the comparison unit.

11. The method of claim 10, wherein as the indirect password, any one of consonants, vowels, and combinations thereof of the Korean alphabet, and simple symbols is used instead of the English alphabet.

12. The method of claim 10, further comprising:
- repeatedly and randomly displaying the indirect password recognition keypad at the same times as the number of digits of a password and whenever the keypad is displayed, recognizing an indirect password corresponding to each one digit of the password; and
- after an indirect password is recognized through the indirect password recognition keypads displayed at the same times as the number of digits of a password, inputting the indirect password at once through an indirect password keypad.

13. The method of claim 10, further comprising:
- sequentially displaying the indirect password recognition keypad and the indirect password keypad and inputting the first digit of an indirect password; and
- by repeating the displaying and inputting, inputting the remaining digits of the indirect password.

14. A method for inputting a password on a webpage in electronic commerce over the Internet banking, Internet stock trade and Internet shopping mall, wherein cases of numbers and letters to randomly arrange a pair of a number from 0 to 9 and a letter from A to J corresponding to each number, cases of letters to randomly arrange 10 letters from A to J, and a program to display an indirect password recognition keypad and an indirect password keypad by using the cases of numbers and letters are stored in a memory; and a CPU drives the program stored in the memory and provides the indirect password recognition keypad, in which each pair of a number and a letter is randomly arranged, on the display unit, and if user's recognition of an indirect password through the indirect password recognition keypad is completed, the CPU displays an indirect password keypad, in which only the letters are randomly arranged, and if an indirect password formed by letters is input through the indirect password keypad, obtains a password formed by numbers by comparing the input indirect password with the already provided indirect password recognition keypad, the method comprising:
- displaying the indirect password recognition keypad on the display unit, by driving the program stored in the memory;
- inputting an indirect password organized into letters corresponding to numbers of password recognized through the indirect password recognition keypad; and
- recognizing the indirect password into a number password by comparing the inputted indirect password with the password formed by numbers obtained in the CPU.

15. A method for inputting a password of claim 14, further comprising: displaying the indirect password keypad on the display after displaying the indirect password recognition keypad and before inputting the indirect password, wherein inputting the indirect password is carried out by inputting the indirect password through the indirect password keypad.

* * * * *